US006270690B1

(12) United States Patent
Himmrich et al.

(10) Patent No.: US 6,270,690 B1
(45) Date of Patent: Aug. 7, 2001

(54) STORAGE STABLE BLEACH ACTIVATOR GRANULES

(75) Inventors: Johannes Himmrich, Kirchen; Frank-Peter Lang, Hattersheim, both of (DE)

(73) Assignee: Clariant GmbH, Frankfurt (DE)

(*) Notice: Subject to any disclaimer, the term of this patent is extended or adjusted under 35 U.S.C. 154(b) by 0 days.

(21) Appl. No.: 09/153,602

(22) Filed: Sep. 15, 1998

(30) Foreign Application Priority Data

Sep. 16, 1997 (DE) .............................................. 197 40 668

(51) Int. Cl.[7] ....................................................... A01N 3/00

(52) U.S. Cl. ................................ 252/186.38; 252/186.25; 252/186.39

(58) Field of Search ......................... 252/186.25, 186.38, 252/186.39

(56) References Cited

U.S. PATENT DOCUMENTS

| | | | | |
|---|---|---|---|---|
| 3,789,002 | | 1/1974 | Weber et al. | 252/182.12 |
| 4,207,199 | | 6/1980 | Perner et al. | 252/186.38 |
| 4,372,868 | | 2/1983 | Saran et sal. | 252/186.38 |
| 4,457,858 | | 7/1984 | Saran et al. | 427/203 |
| 4,695,397 | | 9/1987 | Sommer et al. | 524/41 |
| 4,999,125 | * | 3/1991 | Goodman et al. | 252/90 |
| 5,318,714 | * | 6/1994 | Markussen et al. | 252/95 |
| 5,716,569 | | 2/1998 | Berenbold et al. | 264/115 |

FOREIGN PATENT DOCUMENTS

| | | |
|---|---|---|
| 2048331 | 4/1972 | (DE) . |
| 2733849 | 2/1979 | (DE) . |
| 4439039 | 5/1996 | (DE) . |
| 0037026 | 10/1981 | (EP) . |
| 0051987 | 5/1982 | (EP) . |
| 0070474 | 1/1983 | (EP) . |
| 0075818 | 4/1983 | (EP) . |
| 0240057 | 10/1987 | (EP) . |
| 0710714 | 5/1996 | (EP) . |
| 1507312 | 4/1978 | (GB) . |
| 2249104 | 4/1992 | (GB) . |
| 2294694 | 5/1996 | (GB) . |
| WO 90/01535 | 2/1990 | (WO) . |
| WO 92/13798 | 8/1992 | (WO) . |
| WO 94/03395 | 2/1994 | (WO) . |
| WO 96/17030 | 6/1996 | (WO) . |

OTHER PUBLICATIONS

PCT Search Report

Derwent Patent Family Report and/or Abstract.

* cited by examiner

*Primary Examiner*—Lyle A. Alexander
*Assistant Examiner*—Monique T. Cole
(74) *Attorney, Agent, or Firm*—Miles B. Dearth; Scott E. Hanf

(57) ABSTRACT

The invention relates to storage-stable bleach activator granules consisting essentially of a bleach activator and an acid-modified phyllosilicate, prepared by mixing a dry bleach activator with a dry, acid-modified phyllosilicate, compressing this mixture to give relatively large agglomerates and comminuting these agglomerates to the desired particle size.

9 Claims, No Drawings

STORAGE STABLE BLEACH ACTIVATOR GRANULES

BACKGROUND OF THE INVENTION

Bleach activators are important constituents in compact detergents, stain removal salts and dishwashing detergents. At from 40 to 60° C., they permit a bleaching result which is comparable with a boil wash, by reacting with hydrogen peroxide donors (in most cases perborates or percarbonates) to release an organic peroxy acid.

The bleaching result obtainable depends on the nature and reactivity of the peroxycarboxylic acid formed, on the structure of the bond that is to be perhydrolyzed and on the solubility of the bleach activator in water. Since the activator is usually a reactive ester or an amide, it is frequently necessary to use it in granulated or coated form for the intended application area in order to prevent hydrolysis in the presence of alkaline detergent constituents and to ensure an adequate shelf life.

Numerous auxiliaries and processes have been proposed in the past for granulating these substances. EP-A-0 037 026 describes a process for producing readily soluble activator granules comprising between 90 and 98% by weight of activator. For this purpose, the pulverulent bleach activator is homogeneously mixed with likewise pulverulent cellulose ethers or starch ethers and then sprayed with water or an aqueous solution of the cellulose ether, simultaneously granulated and then dried.

According to EP-A-0 070 474, it is possible to prepare similar granules by spray drying aqueous suspensions comprising the activator and the cellulose ether. Granules consisting of bleach activator, cellulose ethers and additives of an organic $C_3$–$C_4$-carboxylic or hydroxycarboxylic acid are described in WO 90/01535 and WO 92/13798. While in WO 90/01535, the organic carboxylic acid is incorporated into the granule core in order to accelerate its solubility, in WO 92/13798, the carboxylic acid is deposited on the finished granule in an additional coating stage. The protective acid coating should prevent spotting of the bleach and contribute to preserving the color of the fabric. WO 94/03395 claims the use of acidic polymer compounds having a solubility in water of>5 g/l (at 20° C.) and molecular weights of from 1000 to 250 000 for the same purpose.

Granules of bleach activators in which mixtures of soaps and free fatty acids are used as granulating auxiliaries are likewise described (GB-A-1 507 312).

A waterless preparation process is known from EP-A-0 075 818. Here, the bleach activator, together with an organic binder, for example a fatty alcohol ethoxylate, is compressed by compaction under pressure to give particles having diameters of from 0.5 to 3 mm.

For most of these specified granulation processes, it is a prerequisite that the bleach activator to be granulated is a solid and has a high melting point. This is necessary in order that during preparation it does not react with the binder or water present and decompose. Thus, in DE-A 2 048 331, for example, preference is given to activators which have a melting point of preferably at least 100° C., in particular at least 150° C.

The binders which have hitherto been used are predominantly organic compounds.

This can, however, cause problems which limit the use of the granules.

If surface-active compounds are used, such as soaps, fatty acids, anionic surfactants or fatty alcohol ethoxylates, then the granules prepared therewith are unsuitable for use in dishwashing detergents since problems with foam arise under the washing conditions. This is even the case when normally low-foam highly ethoxylated fatty alcohols are used. For use in dishwashing detergents, therefore, activator granules whose binder consists of cellulose ethers are predominantly used. The biodegradability of this group of products is, however, moderate.

A further problem relates to suitable granules for stain removal salts. Modern formulations consist of mixtures of percarbonate and TAED granules. In order to prevent exothermic decomposition of these mixtures (percarbonate as a combustion-promoting substance in combination with organic material) during preparation and storage, inert materials, such as sodium carbonate, sodium hydrogencarbonate or sodium sulfate are frequently added. For this field of application, inert binders or coating agents would be of great interest.

There therefore continues to be a need for suitable activator granules which are without problems from an ecological point of view, can be used universally and can be prepared at favorable cost.

Inorganic materials as carriers for bleach activators are known per se. For example, DE-A 2 733 849 proposes the adsorption of liquid activators, such as diacetylmethylamine, diacetylbutylamine or acetal caprolactam on inorganic adsorbants, such as kieselguhr, magnesium aluminum silicates, sodium or calcium aluminum silicates, activated silica or aluminum oxide. Granules are not, however, described therein.

Furthermore, according to GB-A 2 249 104, it is possible to prepare particles in which a bleach activator solid per se is deposited in finely divided form on an inorganic carrier material. For this purpose, activator and carrier material are firstly intimately mixed, and an organic solvent (ethanol or toluene) is added, as a result of which the activator goes into solution. By subsequently distilling off the solvent, the activator is deposited in very finely divided form on the carrier. The preferred particle size distribution of the particles according to the invention is between 60 and 250 μm.

In addition, EP-A-0 240 057 discloses bleach activator granules which are prepared by mixing an activator with inorganic and organic salts, film-forming polymers and small amounts of smectites or aluminum silicates and subsequently granulating the mixture in the presence of water. Once granulation is complete, a costly drying stage is necessary in order to obtain storage-stable granules.

DE-A 44 39 039 describes a water-free and solvent-free granulation process in which the binders used are bentonites, in particular bentonites which have been activated to be alkaline.

SUMMARY OF THE INVENTION

Surprisingly, it has now been found that the storage stability can be improved and the content of activator in the activator granules can be increased if the binder used comprises acid-modified phyllosilicates.

The invention provides storage-stable bleach activator granules which essentially consist of a bleach activator and an acid-modified phyllosilicate and which are prepared by mixing the dry bleach activator with the dry, acid-modified phyllosilicate, compressing this mixture to give relatively large agglomerates and comminuting these agglomerates to the desired particle size.

DESCRIPTION OF THE PREFERRED EMBODIMENTS

Suitable acid-modified phyllosilicates are phyllosilicates treated with mineral acid, preferably bentonites, in particular smectic clays from the group of alkali metal or alkaline earth metal montmorillonites, saponites or hectorites. Particular preference is given to the products of this type which are available commercially under the names ®Tonsil EX 519, Tonsil Optimum 210 FF, Tonsil Standard 310 FF and 314 FF, and ®Opazil SO from Süd-Chemie, Munich (DE). Depending on demand, the abovementioned binder materials can be used as individual substances or as mixtures. As a result of the acid modification, the alkali metal and/or alkaline earth metal ions between the layer packets of the phyllosilicates are removed and replaced by hydrogen ions. When replacement is complete, the addition of further acid leads to a partial dissolution of the Al and Mg ions from the octahedral layer in the edge region of the layer packets. What remains is the voluminous silica, which is still bonded by $SiO_4$ tetrahedra to the bentonite which has not been attacked. This results in a loosening of the crystal structure and to a certain disorientation of the layer packets. The particles of the acid-modified phyllosilicates are finer and the specific surface area is greatly increased. These products are as it were an intramolecular combination of amorphous silica and phyllosilicate.

In accordance with the invention, bleach activators which can be used are those having melting points above 60° C. Examples thereof are tetraacetylethylenediamine (TAED), tetraacetylglucoluril (TAGU), diacetyldioxohexahydrotriazine (DADHT), acyloxybenzenesulfonate, such as sodium nonanoyloxybenzenesulfonate (NOBS) or benzoyloxybenzenesulfonate (BOBS) and acylated sugars, such as pentaacetylglucose (PAG) or compounds as described in EP-A-0 325 100, EP-A-0 492 000 and WO 91/10 719.

Other suitable bleach activators are, according to the prior art, activated carboxylic esters, carboxylic anhydrides, lactones, acylals, carboxamides, acyllactams, acylated ureas and oxamides, but in particular also nitriles, which may, in addition to the nitrile group, also contain a quaternized ammonium group. Mixtures of different bleach activators can likewise be used.

Furthermore, the granules according to the invention can also comprise further additives, such as, for example, anionic and nonionic surfactants, which favorably influence the consistency and hardness of the granules according to the invention, and also the homogeneous distribution of the bleach activators.

Preferred anionic surfactants are alkali metal salts, ammonium salts, amine salts and hydroxyalkylamine salts of the following compounds: alkylsulfates, alkyl ether sulfates, alkylamidosulfates, alkylamido ether sulfates, alkylaryl polyether sulfates, monoglyceride sulfates, alkylsulfonates, alkylamidosulfonates, alkylarylsulfonates, α-olefinsulfonates, alkylsulfosuccinates, alkyl ether sulfosuccinates, alkylamidosulfosuccinamates, alkylsulfoacetates, alkylpolyglycerol carboxylates, alkylphosphates, alkyl ether phosphates, alkylsarcosinates, alkylpolypeptidates, alkylamidopolypeptidates, alkylethionates and alkyltaurates. The alkyl radical in all these compounds contains from 8 to 31 carbon atoms, preferably from 8 to 22 carbon atoms, in the linear chain.

Further suitable anionic surfactants are fatty acids, such as oleic acid, ricinoleic acid, palmitic acid, stearic acid and salts thereof, copra oil acid salt or hydrogenated copra oil acid salts, carboxylic acids of polyglycol ethers or the formula $$A—(OCH_2—CH_2)_n—OCH_2—CO_2H$$

in which A is $C_{12}$–$C_{18}$-alkyl and n is an integer between 5 and 15 are likewise suitable anionic additives for the granules according to the invention.

Preferred nonionic surfactants are polyethoxylated, polypropoxylated or polyglycerylated ethers of fatty alcohols, polyethoxylated, polypropoxylated and polyglycerylated fatty acid esters, polyethoxylated esters of fatty acids and of sorbitol, and polyethoxylated or polyglycerylated fatty amines.

Further additives are substances which react in the wash liquor with the peroxycarboxylic acid liberated from the activator to form reactive intermediates, such as dioxiranes or oxaziridines, and in so doing can increase the reactivity. Suitable compounds are ketones and sulfonimines according to U.S. Pat. No. 3,822,114 and EP-A-0 446 982. Further possible additives are those which influence the bleaching power, such as complexing agents, polycarboxylates and iron- and manganese-containing metal complexes, as described in EP-A-0 458 397 and EP-A-0 458 398.

The ratio of bleach activator to binder is generally from 50:50 to 98:2, preferably from 70:30 to 96:4, based on the total weight of the granules. The amounts of additives depend in particular on their type. Amounts of from 0 to 20% by weight, in particular amounts of from 1 to 10% by weight, based on the total weight of the granules, are generally sufficient. By contrast, metal complexes are added in concentrations in the ppm range.

The granules are prepared by firstly intimately mixing the mixture of bleach activator and binder in a mixing unit (e.g. plowshare mixer) (step a). In a second step, the mixture is compressed to give relatively large particles (step b). Devices suitable for this purpose include roller compactors. The compacts are then subjected to comminution (grinding) and comminuted to the desired particle size (step c). Devices suitable for this purpose are toothed-disk rollers and/or sieves.

Fine fractions and coarse material are sieved off and returned to the process. While the coarse fraction is passed directly to be recomminuted, the fine fraction is introduced into the compacting stage. The particle size of the product is generally in the range from 100 to 2000 μm, preferably from 300 to 1800 μm. The bulk density of the granules according to the invention is above 500 $kg/m^3$, preferably above 600 $kg/m^3$.

The granules obtained in this way are suitable for direct use in detergents and cleaning compositions. This includes bleaches and disinfectants. In a particularly preferred use form, they can, however, be provided with a coating sheath.

To this end, the granules according to the invention are coated with a film-forming substance in an additional step d), as a result of which the product properties can be significantly influenced.

Suitable coating agents are all film-forming substances, such as waxes, silicones, fatty acids, soaps, anionic surfactants, nonionic surfactants, cationic surfactants and anionic and cationic polymers, e.g. polyacrylic acid.

Preference is given to using coating substances having a melting point of 30–100° C.

By using these coating materials, it is possible inter alia to delay the dissolution behavior in order to stop interactions between the bleach activator and the enzyme system at the start of the washing process. Furthermore, in this way it is possible to reduce the dust content, increase the abrasion resistance and improve the storage stability.

If the intention is to use the granules according to the invention in dishwashing detergents, the most suitable coatings are waxes having melting points of from 40 to 50° C.

Acid coating agents increase the storage stability of the granules in percarbonate containing highly alkaline formulations and reduce color damage by spotting. Dye additives are likewise possible.

The coating materials are normally applied by spraying the molten coating materials or coating materials dissolved in a solvent. In accordance with the invention, the coating material can be applied to the granule core according to the invention in amounts of from 0 to 20% by weight, preferably from 1 to 10% by weight, based on the total weight.

The products according to the invention are notable for good storage stability in pulverulent detergents, cleaning compositions and disinfectant formulations.

They are ideal for use in standard detergents, stain removal salts, dishwashing detergents, all-purpose cleaning powders and denture cleaners.

In these formulations, the granules according to the invention are in most cases used in combination with a hydrogen peroxide source. Examples thereof are perborate monohydrate, perborate tetrahydrate, percarbonates and also adducts of hydrogen peroxide with urea or amine oxides.

In addition, the formulation, in accordance with the prior art, can have further detergent constituents, such as organic and inorganic builders and cobuilders, surfactants, enzymes, brighteners and perfume.

The examples below serve to illustrate the invention without limiting it.

PREPARATION AND APPLICATION EXAMPLES

Example 1: Preparation 10 kg of a mixture of 92% by weight TAED and 8% by weight acid-modified bentonite (®Tonsil EX 519 from S üd-Chemie AG, Munich (DE)) are intensively mixed at a speed of 70 rpm in a 50 l Lödige mixer over a period of 10 min. This homogeneous mixture is then compressed to flakes on a Pharmapaktor roller compactor (Bepex (DE)) at a pressing force of from 50 to 60 kN; the flakes are then comminuted in a two-stage grinding process, pregrinding using toothed-disk rollers (Alexanderwerk (DE)) and comminution in a sieve (Frewitt (DE)) at a mesh size of 2000 μm.

This gives 5.3 kg of granules having a particle size distribution of from 200 to 1600 μm (yield: 53%), and also 2.8 kg of fine material <200 μm (28%), which can be recycled by recompacting, and 1.9 kg of coarse material >1600 μm (19%), which can be processed by regrinding.

Example 2: Rate of Activation 8 g of standard detergent WMP without bleaching system (Krefeld Laundry Research (DE)) and 1.5 g of sodium perborate monohydrate are dissolved in 1 l of distilled water at 20° C. in a 2 l beaker, and then 0.5 g of activator is added thereto. The content of peracetic acid formed is determined by means of iodometric titration as a function of the time after the activator has been added.

The activators used in this investigation were the following products:

Granules 1: granules according to the invention as in Example 1

Granules 2: Comparative example, granules as in DE-OS 44 39 039 (Example 1)

| | peracetic acid liberated in % from | |
|---|---|---|
| Time [min] | Granules 1 | Granules 2 |
| 1 | 20 | 29 |
| 3 | 42 | 68 |
| 5 | 65 | 84 |
| 7 | 77 | 93 |
| 9 | 85 | 100 |
| 11 | 91 | |
| 13 | 95 | |
| 15 | 98 | |
| 17 | 100 | |

The granules 1 according to the invention exhibit delayed peracetic acid formation compared with the comparative example granules 2 at a temperature of 20° C., which can be attributed to better stabilization of the activator TAED in the granules 1.

Example 3: Storage stability

To determine the storage stability, 8.0 g of standard detergent WMP without bleaching system (Krefeld Laundry Research (DE)) are homogeneously mixed with 1.5 g of sodium perborate monohydrate and 0.5 g of activator, and the mixture is then stored in folding boxes at 38° C. and 80% relative atmospheric humidity in a climatically controlled cabinet (quick test). At certain intervals, the remaining activator content is determined by iodometric titration.

The activators used are granules 1 and granules 2 as in Example 2.

| | Residual content of activator (%) | |
|---|---|---|
| Days | Granules 1 | Granules 2 |
| 2 | 98 | 97 |
| 7 | 81 | 62 |
| 10 | 65 | 37 |
| 14 | 51 | 27 |

The example shows that the granules 1 according to the invention, for the same content of activator (92%), have a significantly better storage stability compared to granules 2 (comparative example).

Example 4: Bleaching Activity

The bleaching activity of activator granules is determined by washing tests in a Linitest device (Hereaus, Hanau (DE)). 1.0 g of standard detergent (WMP) without bleaching system (Krefeld Laundry Research (DE)), 150 mg of sodium perborate monohydrate and 50 mg of activator are combined in a beaker containing 200 ml of water (15° German hardness), the test soiling is added and then washed in a Linitest device for 10 min with heating to from 20° C. to 40° C. and for 20 min at 40° C. The test soiling used to test the bleaching activity is tea on cotton (Krefeld Laundry Research (DE)). The degree of whiteness of the fabric is determined using an Elrepho color measuring device 2000 (Datacolor (DE)).

The activators used are granules 1 and granules 2 as in Example 2.

| Test soiling | Reflectance difference (%) Granules 1 | Granules 2 |
|---|---|---|
| Tea on cotton | 26.8 | 27.2 |

The example shows that the granules 1 according to the invention, for an improved storage stability, have a bleaching activity comparable with the prior art.

What is claimed is:

1. Storage-stable bleach activator granules consisting essentially of a bleach activator and an acid-modified phyllosilicate, prepared by mixing a dry bleach activator with a dry, acid-modified phyllosilicate, compressing this mixture and comminuting these agglomerates to a particle size in the range of 100 to 2000 μm.

2. Storage-stable bleach activator granules as claimed in claim 1, wherein the acid-modified phyllosilicates used are natural and/or artificial bentonites.

3. Storage-stable bleach activator granules as claimed in claim 1, wherein the bleach activator is selected from at least one of the group consisting of N-acylated amines, amides, lactams, lactones, oxamides, nitriles, activated carboxylic acid esters and carboxylic anhydrides.

4. Storage-stable bleach activator granules as claimed in claim 1, wherein the weight ratio of bleach activator to acid-modified phyllosilicate is from 50:50 to 98:2.

5. Storage-stable bleach activator granules as claimed in claim 1, wherein the granules comprise from 0 to 20% by weight, based on the total weight, of an additive selected from the group consisting of anionic surfactant and nonionic surfactant.

6. Storage-stable bleach activator granules as claimed in claim 1, wherein the granules have a particle size in the range of from 300 to 1800 μm.

7. Storage-stable bleach activator granules as claimed in claim 1, wherein the granules are additionally coated with a coating layer.

8. A process for the use of the bleach-activator granules as claimed in claim 1 comprising combining said granules together with a hydrogen peroxide source to form a detergent or cleaning composition.

9. Storage-stable bleach activator granules as claimed in claim 4, wherein said weight ratio is from 70:30 to 96:4.

* * * * *